United States Patent
Takakura et al.

(10) Patent No.: US 10,578,454 B2
(45) Date of Patent: Mar. 3, 2020

(54) ROUTE CALCULATION SYSTEM, COMPUTER PROGRAM PRODUCT, AND STORAGE MEDIUM

(71) Applicant: DENSO CORPORATION, Kariya, Aichi-pref. (JP)

(72) Inventors: Akina Takakura, Kariya (JP); Ichiro Yoshida, Kariya (JP); Takafumi Ito, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 8 days.

(21) Appl. No.: 16/078,424

(22) PCT Filed: Jan. 12, 2017

(86) PCT No.: PCT/JP2017/000810
§ 371 (c)(1),
(2) Date: Aug. 21, 2018

(87) PCT Pub. No.: WO2017/145550
PCT Pub. Date: Aug. 31, 2017

(65) Prior Publication Data
US 2019/0049266 A1 Feb. 14, 2019

(30) Foreign Application Priority Data
Feb. 23, 2016 (JP) ................................ 2016-031954

(51) Int. Cl.
*G01C 21/36* (2006.01)
*G06F 3/01* (2006.01)
(Continued)

(52) U.S. Cl.
CPC ..... *G01C 21/3641* (2013.01); *G01C 21/3415* (2013.01); *G01C 21/36* (2013.01); *G06F 3/015* (2013.01); *G09B 29/106* (2013.01)

(58) Field of Classification Search
CPC .......................... G01C 21/3415; G01C 21/36; G01C 21/3641; G06F 3/015; G09B 29/106
See application file for complete search history.

(56) References Cited

U.S. PATENT DOCUMENTS 9,997,069 B2 * 6/2018 Bennett ............ G08G 1/096855
2002/0077747 A1 * 6/2002 Hijikata ............. G01C 21/3415
701/411
(Continued)

FOREIGN PATENT DOCUMENTS

JP 2005321224 A 11/2005
JP 2007108017 A 4/2007
(Continued)

*Primary Examiner* — Tyler J Lee
(74) *Attorney, Agent, or Firm* — Harness, Dickey & Pierce, P.L.C.

(57) ABSTRACT

A route calculation system includes: a route calculation data storage unit storing route calculation data; a route calculation unit calculating a route using the route calculation data and recalculating the route using the route calculation data when a predetermined recalculation condition is satisfied; a notification information output unit outputting notification information informing recalculation of the route; a brain activity detection unit detecting brain activity of a user; a brain activity determination unit determining detection result of the brain activity detection unit; a notification determination unit determining whether notification information output is necessary according to determination result of the brain activity determination unit after the route is recalculated; and a notification control unit enabling notification information output when notification information output is determined to be necessary and disabling notification information output when notification information output is determined to be not necessary.

9 Claims, 15 Drawing Sheets

(51) Int. Cl.
    *G09B 29/10*     (2006.01)
    *G01C 21/34*     (2006.01)

(56) References Cited

U.S. PATENT DOCUMENTS

| | | | |
|---|---|---|---|
| 2004/0199325 A1* | 10/2004 | Kishigami | G01C 21/3641 |
| | | | 701/417 |
| 2006/0293799 A1* | 12/2006 | Powers | G01C 21/26 |
| | | | 701/1 |
| 2007/0088502 A1 | 4/2007 | Oumi et al. | |
| 2009/0005929 A1* | 1/2009 | Nakao | B60T 7/22 |
| | | | 701/33.4 |
| 2010/0010365 A1* | 1/2010 | Terao | A61B 5/04012 |
| | | | 600/544 |
| 2011/0224897 A1* | 9/2011 | Tan | G01C 21/3664 |
| | | | 701/532 |
| 2013/0049943 A1* | 2/2013 | Wendt | B60W 50/14 |
| | | | 340/439 |
| 2015/0272496 A1* | 10/2015 | Klappert | A61B 5/7267 |
| | | | 600/545 |
| 2019/0038166 A1* | 2/2019 | Tavabi | A61B 5/0478 |

FOREIGN PATENT DOCUMENTS

| | | |
|---|---|---|
| JP | 2008117303 A | 5/2008 |
| JP | 2010038821 A | 2/2010 |

\* cited by examiner

FIG. 2
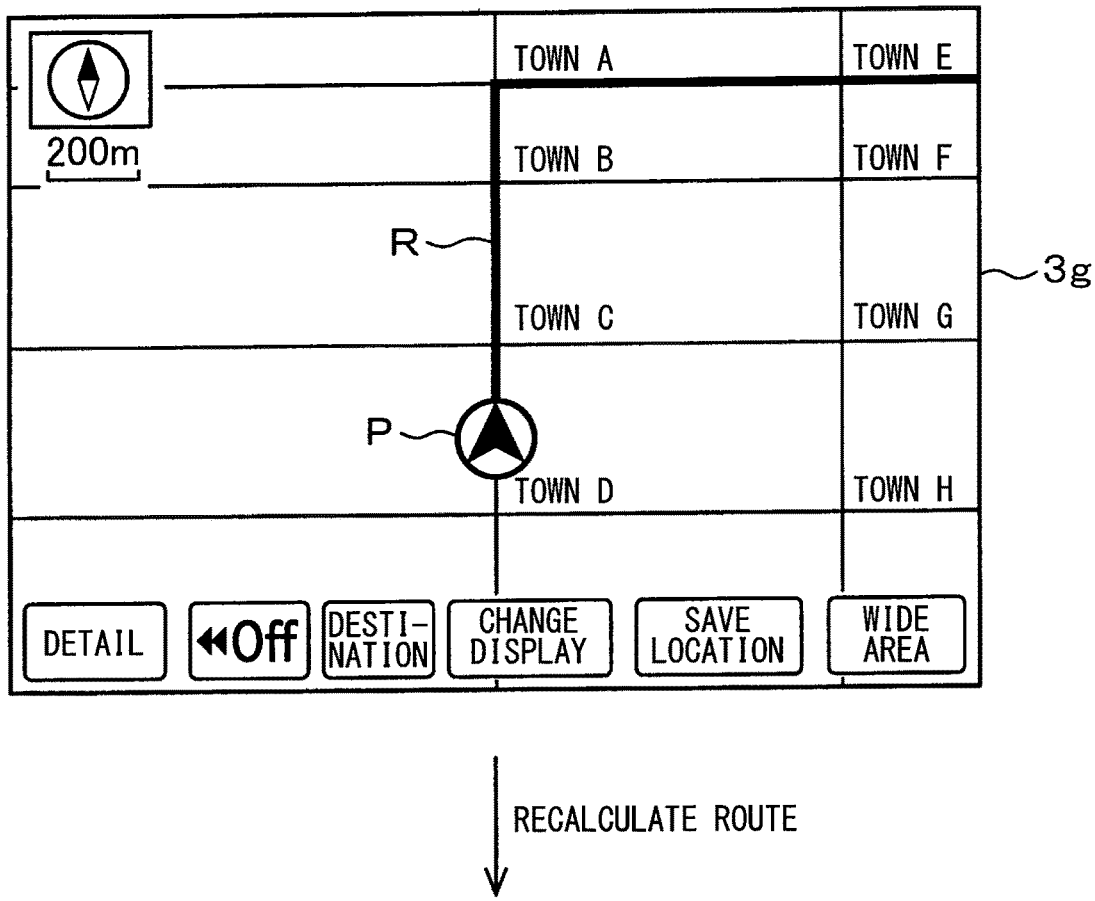
RECALCULATE ROUTE
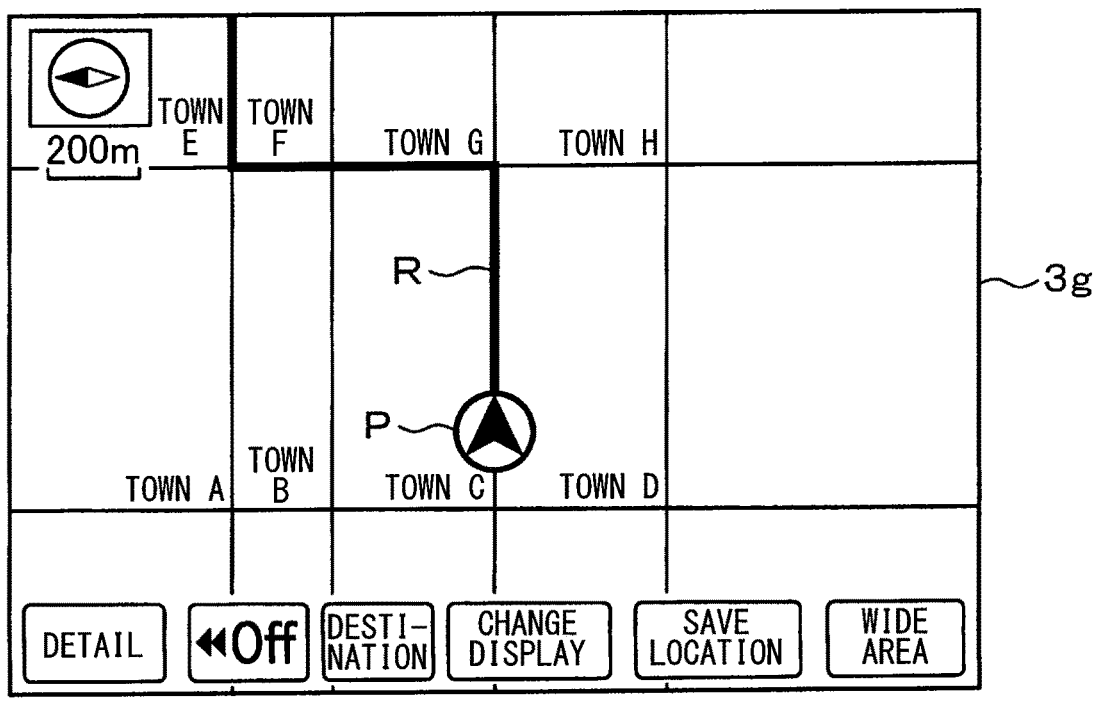

WHEN USER CHANGES ROUTE PURPOSEFULLY

WHEN USER CHANGES ROUTE ACCIDENTALLY BY MISTAKE

WHEN USER'S INTENTION CANNOT BE DETERMINED

WHEN USER CHANGES ROUTE PURPOSEFULLY

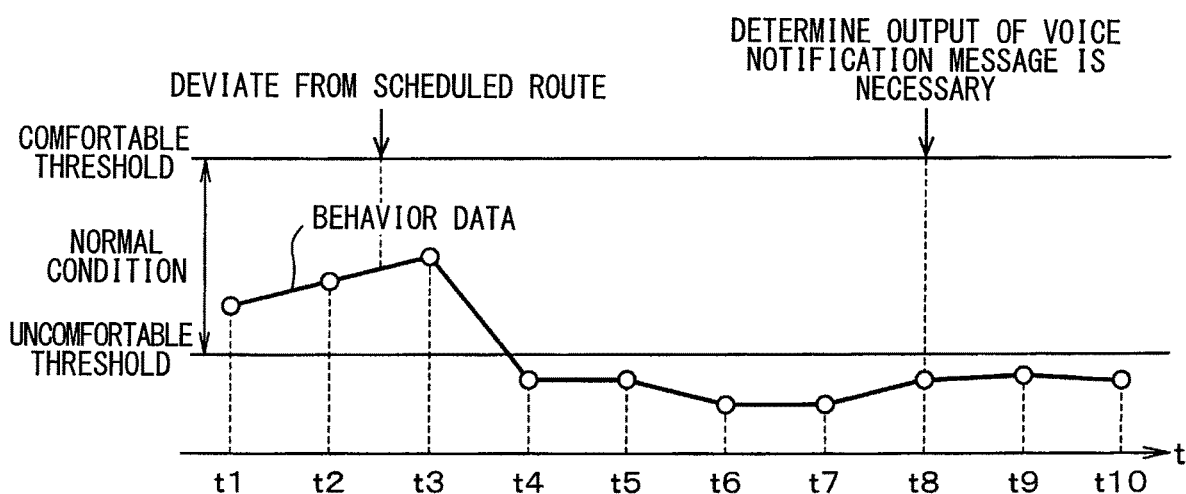

WHEN USER'S INTENTION CANNOT BE DETERMINED

FIG. 9

| | RESULT OF BRAIN ACTIVITY DETERMINATION PROCESS | | |
|---|---|---|---|
| RESULT OF BEHAVIOR DETERMINATION PROCESS | VOICE OUTPUT IS NECESSARY | VOICE OUTPUT IS NOT NECESSARY | NECESSITY OF VOICE OUTPUT CANNOT BE DETERMINED |
| VOICE OUTPUT IS NECESSARY | ENABLE OUTPUT OF VOICE NOTIFICATION MESSAGE | ENABLE OUTPUT OF VOICE NOTIFICATION MESSAGE | ENABLE OUTPUT OF VOICE NOTIFICATION MESSAGE |
| VOICE OUTPUT IS NOT NECESSARY | ENABLE OUTPUT OF VOICE NOTIFICATION MESSAGE | DISABLE OUTPUT OF VOICE NOTIFICATION MESSAGE | DISABLE OUTPUT OF VOICE NOTIFICATION MESSAGE |
| NECESSITY OF VOICE OUTPUT CANNOT BE DETERMINED | ENABLE OUTPUT OF VOICE NOTIFICATION MESSAGE | DISABLE OUTPUT OF VOICE NOTIFICATION MESSAGE | INQUIRE ABOUT INTENTION TO MODIFY ROUTE |

FIG. 10

| | RESULT OF BRAIN ACTIVITY DETERMINATION PROCESS | | |
|---|---|---|---|
| RESULT OF BEHAVIOR DETERMINATION PROCESS | VOICE OUTPUT IS NECESSARY | VOICE OUTPUT IS NOT NECESSARY | NECESSITY OF VOICE OUTPUT CANNOT BE DETERMINED |
| VOICE OUTPUT IS NECESSARY | ENABLE OUTPUT OF VOICE NOTIFICATION MESSAGE | DISABLE OUTPUT OF VOICE NOTIFICATION MESSAGE | ENABLE OUTPUT OF VOICE NOTIFICATION MESSAGE |
| VOICE OUTPUT IS NOT NECESSARY | DISABLE OUTPUT OF VOICE NOTIFICATION MESSAGE | DISABLE OUTPUT OF VOICE NOTIFICATION MESSAGE | DISABLE OUTPUT OF VOICE NOTIFICATION MESSAGE |
| NECESSITY OF VOICE OUTPUT CANNOT BE DETERMINED | ENABLE OUTPUT OF VOICE NOTIFICATION MESSAGE | DISABLE OUTPUT OF VOICE NOTIFICATION MESSAGE | INQUIRE ABOUT INTENTION TO MODIFY ROUTE |

FIG. 11

| | RESULT OF BRAIN ACTIVITY DETERMINATION PROCESS | | |
|---|---|---|---|
| RESULT OF BEHAVIOR DETERMINATION PROCESS | VOICE OUTPUT IS NECESSARY | VOICE OUTPUT IS NOT NECESSARY | NECESSITY OF VOICE OUTPUT CANNOT BE DETERMINED |
| VOICE OUTPUT IS NECESSARY | ENABLE OUTPUT OF VOICE NOTIFICATION MESSAGE | DISABLE OUTPUT OF VOICE NOTIFICATION MESSAGE | INQUIRE ABOUT INTENTION TO MODIFY ROUTE |
| VOICE OUTPUT IS NOT NECESSARY | DISABLE OUTPUT OF VOICE NOTIFICATION MESSAGE | DISABLE OUTPUT OF VOICE NOTIFICATION MESSAGE | DISABLE OUTPUT OF VOICE NOTIFICATION MESSAGE |
| NECESSITY OF VOICE OUTPUT CANNOT BE DETERMINED | INQUIRE ABOUT INTENTION TO MODIFY ROUTE | DISABLE OUTPUT OF VOICE NOTIFICATION MESSAGE | INQUIRE ABOUT INTENTION TO MODIFY ROUTE |

FIG. 12

| | RESULT OF BRAIN ACTIVITY DETERMINATION PROCESS | | |
|---|---|---|---|
| RESULT OF BEHAVIOR DETERMINATION PROCESS | VOICE OUTPUT IS NECESSARY | VOICE OUTPUT IS NOT NECESSARY | NECESSITY OF VOICE OUTPUT CANNOT BE DETERMINED |
| VOICE OUTPUT IS NECESSARY | ENABLE OUTPUT OF VOICE NOTIFICATION MESSAGE | DISABLE OUTPUT OF VOICE NOTIFICATION MESSAGE | INQUIRE ABOUT INTENTION TO MODIFY ROUTE |
| VOICE OUTPUT IS NOT NECESSARY | DISABLE OUTPUT OF VOICE NOTIFICATION MESSAGE | DISABLE OUTPUT OF VOICE NOTIFICATION MESSAGE | INQUIRE ABOUT INTENTION TO MODIFY ROUTE |
| NECESSITY OF VOICE OUTPUT CANNOT BE DETERMINED | INQUIRE ABOUT INTENTION TO MODIFY ROUTE | INQUIRE ABOUT INTENTION TO MODIFY ROUTE | INQUIRE ABOUT INTENTION TO MODIFY ROUTE |

ROUTE CALCULATION SYSTEM, COMPUTER PROGRAM PRODUCT, AND STORAGE MEDIUM

CROSS REFERENCE TO RELATED APPLICATIONS

This application is a U.S. National Phase Application under 35 U.S.C. 371 of International Application No. PCT/JP2017/000810 filed on Jan. 12, 2017 and published in Japanese as WO/2017/145550 A1 on Aug. 31, 2017. This application is based on and claims the benefit of priority from Japanese Patent Application No. 2016-031954 filed on Feb. 23, 2016. The entire disclosures of all of the above applications are incorporated herein by reference.

TECHNICAL FIELD

The present disclosure relates to a route calculation system, a computer program product, and a storage medium.

BACKGROUND ART

A system configured to calculate a route from, for example, a present location of a vehicle to a destination provides a route guidance by calculating a route using route calculation data and displaying the calculated route superimposed on a map screen. In a case where a present location of the vehicle deviates from the calculated route, the system recalculates the route and notifies a user (driver) that the route is recalculated by outputting a voice notification message, for example, "You are deviating from the scheduled route. New route is being recalculated." A present location of the vehicle deviates from the calculated route in a case where the user deviates from the route accidentally by mistake or in a case where the user deviates from the route purposefully. In the former case, the user is probably a stranger in a present area and has no idea about the present location of the vehicle. It is therefore desirable to output a voice notification message to eliminate anxiety of the user. On the contrary, in the latter case, the user is probably familiar with the area and knows the present location of the vehicle. Hence, the user may possibly be annoyed by an output of a voice notification message.

Such being the case, Patent Literature 1 describes a technique of determining whether the user deviates from the route accidentally by mistake or purposefully according to user's preference.

PRIOR ART LITERATURE

Patent Literature

Patent Literature 1: JP 2010-38821 A

SUMMARY OF INVENTION

By disabling an output of a voice notification message when it is determined that the user deviates from the route purposefully using the technique of Patent Literature 1, a problem that the user is annoyed by an output of a voice notification message may be resolved. However, because the technique of Patent Literature 1 uses the user's preference, acquisition of data to be used to determine the user's preference is absolutely necessary and the technique is not feasible unless a sufficient volume of data is acquired.

In view of the foregoing difficulties, it is an object of the present disclosure to provide a route calculation system, a computer program product, and a storage medium each of which is capable of outputting notification information informing a recalculation of a route only when necessary.

According to an aspect of the present disclosure, a route calculation data storage unit is configured to store route calculation data. A route calculation unit is configured to calculate a route using the route calculation data and recalculate the route using the route calculation data when a predetermined recalculation condition is satisfied. A notification information output unit is configured to output notification information informing a recalculation of the route. A brain activity detection unit is configured to detect brain activity of a user. A brain activity determination unit is configured to determine a detection result of the brain activity detection unit. A notification determination unit is configured to determine whether an output of the notification information is necessary according to a determination result of the brain activity determination unit obtained after the route is recalculated by the route calculation unit. A notification control unit is configured to enable the output of the notification information when the notification determination unit determines that the output of the notification information is necessary and disable the output of the notification information when the notification determination unit determines that the output of the notification information is not necessary.

A present location of the vehicle deviates from the calculated route in a case where the user deviates from the route accidentally by mistake or in a case where the user deviates from the route purposefully, and attention is paid to a fact that brain activity of the user differs between the two cases. That is, in the former case, the user is probably a stranger in a present area and has no idea about the present location of the vehicle. Hence, it is highly likely that brain activity of the user goes out of a normal range of activity due to stress or the like arising from taking a wrong route. Meanwhile, in the latter case, the user is probably familiar with the area and knows the present location of the vehicle. Hence, it is highly likely that brain activity of the user does not go out of the normal range of activity and remains normal.

When brain activity of the user is out of the normal range of activity, it is determined that the user deviates from the route accidentally by mistake. In this case, an output of notification information is enabled. On the contrary, when brain activity of the user remains normal, it is determined that the user deviates from the route purposefully. In this case, an output of notification information is disabled. Accordingly, in a case where the user deviates from the route accidentally by mistake, anxiety of the user can be eliminated by the output of the notification information. Meanwhile, when the user deviates from the route purposefully, the user is no longer annoyed by the notification information because output of the notification information is forbidden. Consequently, convenience can be enhanced by outputting notification information informing a recalculation of the route only when necessary in the manner as above.

BRIEF DESCRIPTION OF DRAWINGS

The above and other objects, features and advantages of the present invention will become more apparent from the following detailed description made with reference to the accompanying drawings. In the drawings:

FIG. 2 is a view showing a manner in which route information is displayed;

FIG. 8B shows a variance in behavior data (second example);

FIG. 9 shows a table (first example) according to which whether to enable or disable a voice output is determined;

FIG. 10 shows a table (second example) according to which whether to enable or disable a voice output is determined;

FIG. 11 shows a table (third example) according to which whether to enable or disable a voice output is determined;

FIG. 12 shows a table (fourth example) according to which whether to enable or disable a voice output is determined.

EMBODIMENTS FOR CARRYING OUT INVENTION

Figure 1:
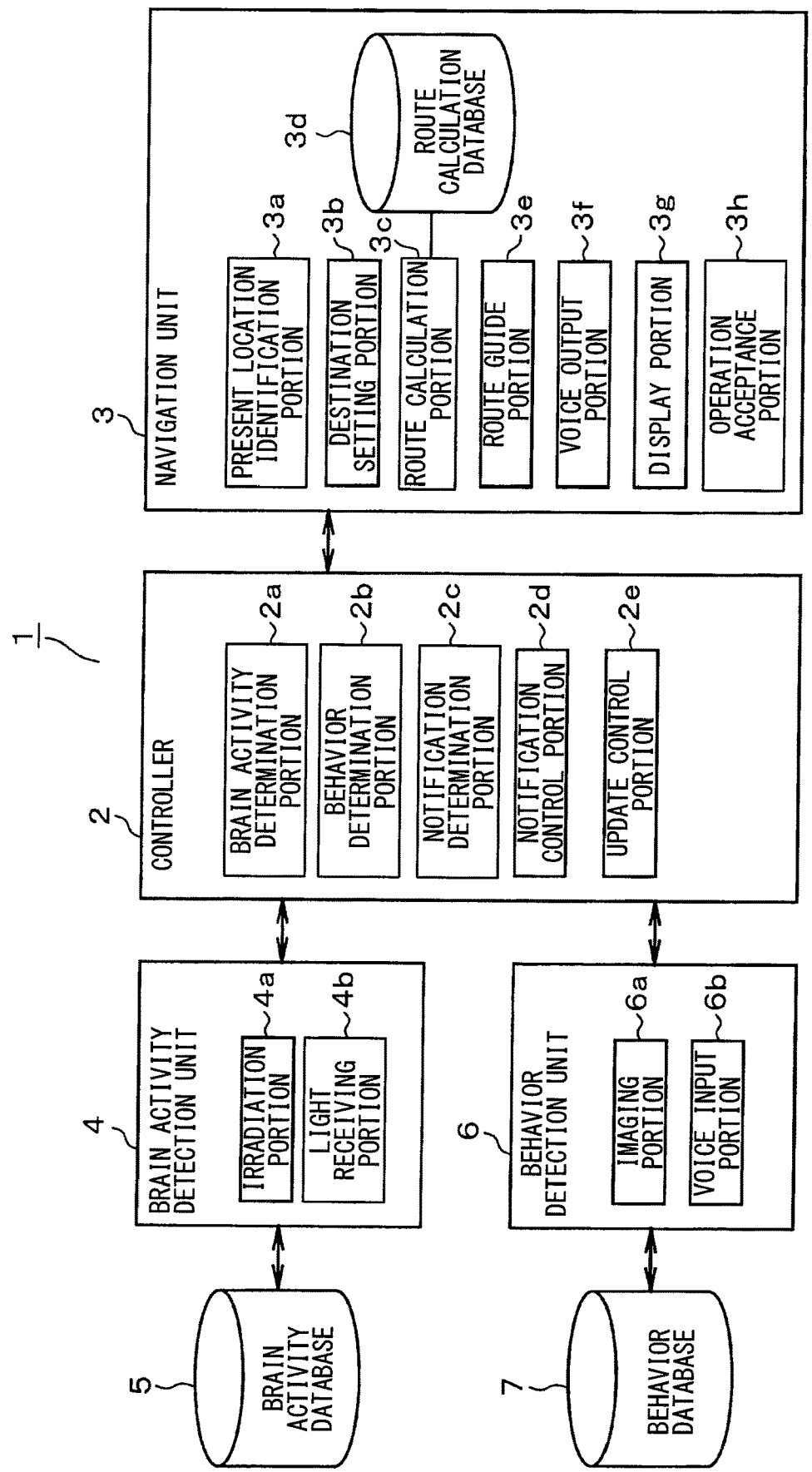
FIG. 1 is a functional block diagram of one embodiment.
Figure 3:
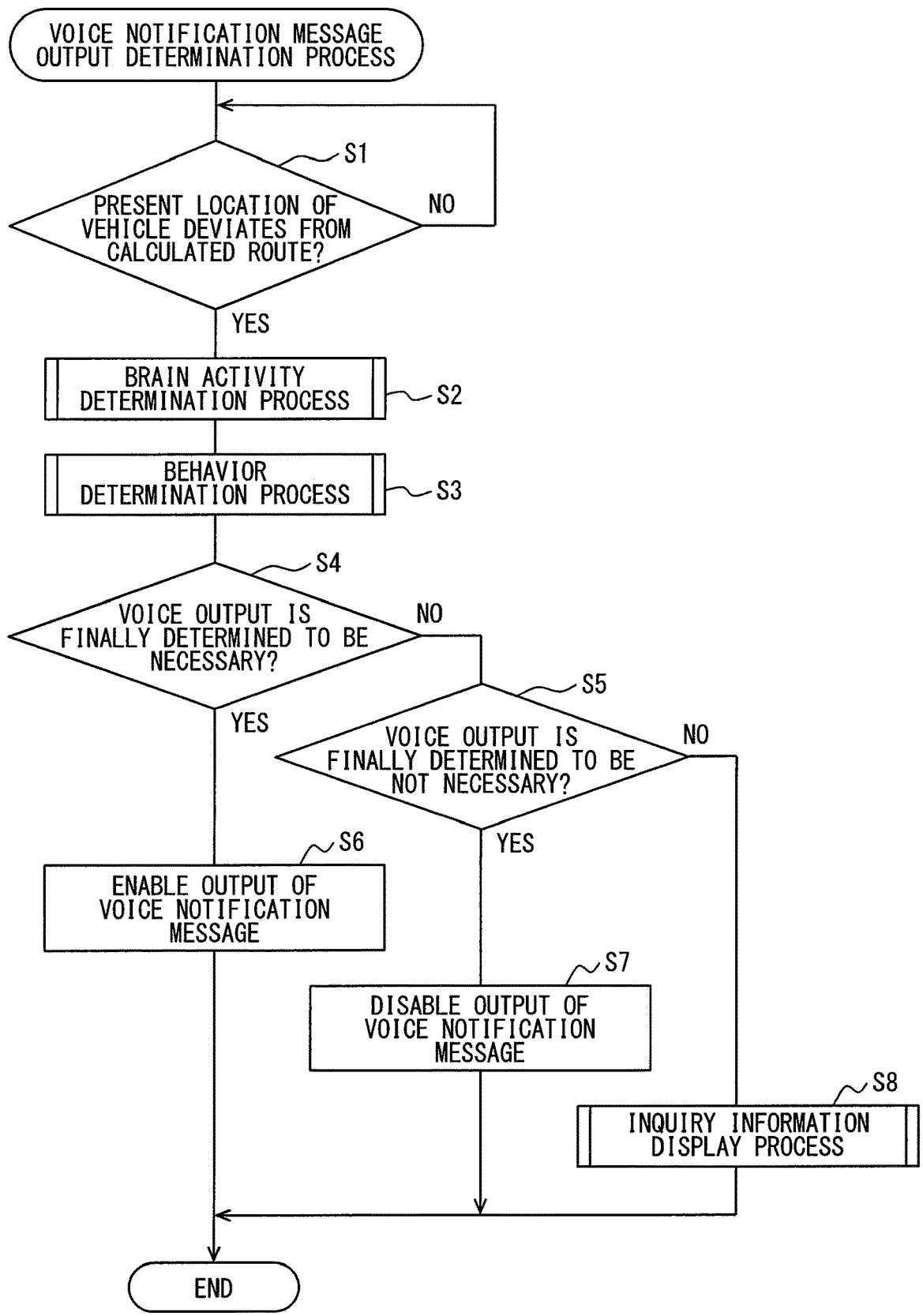
FIG. 3 shows a flowchart.
Figure 4:
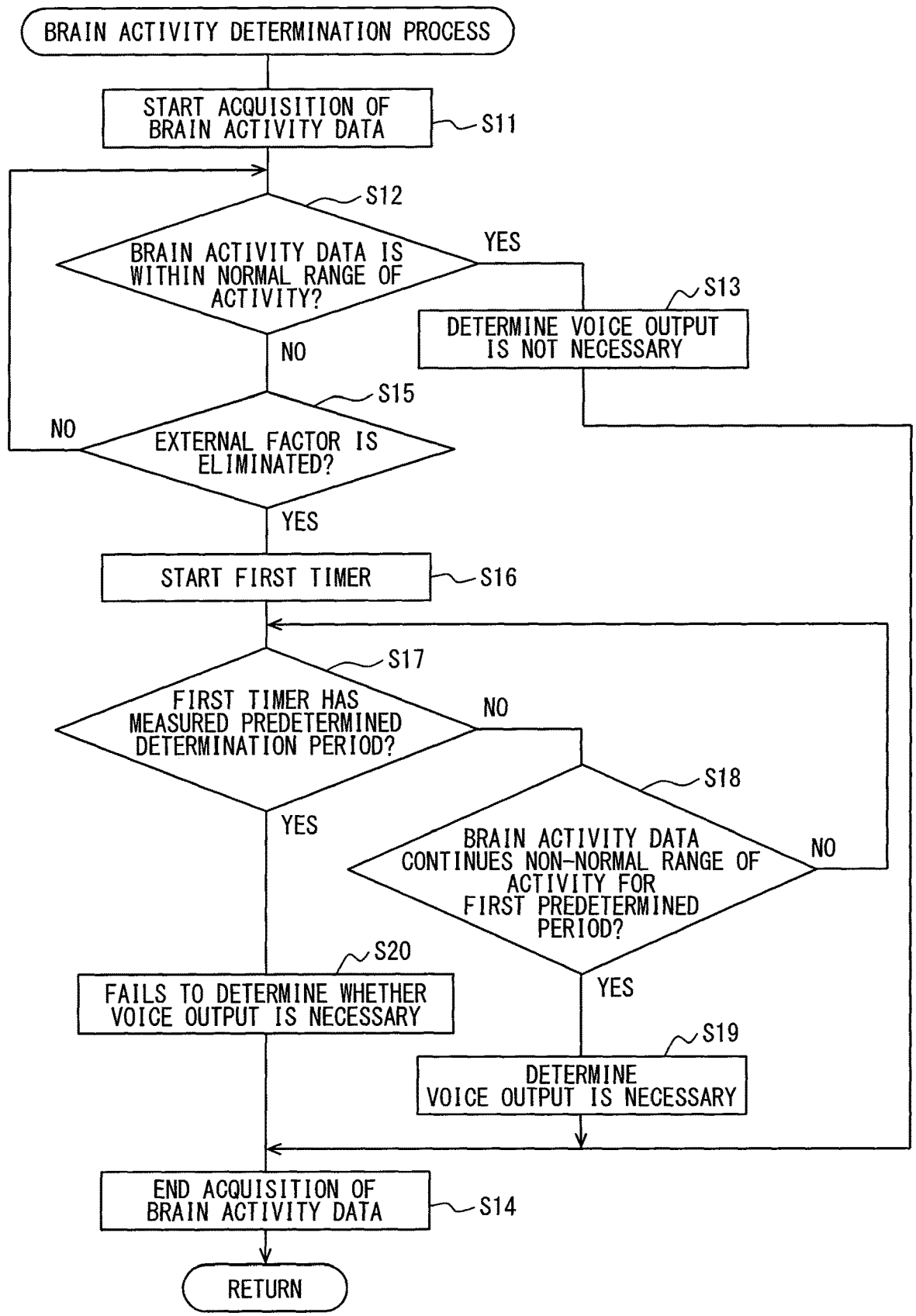
FIG. 4 shows a subroutine of the flowchart.
Figure 5:
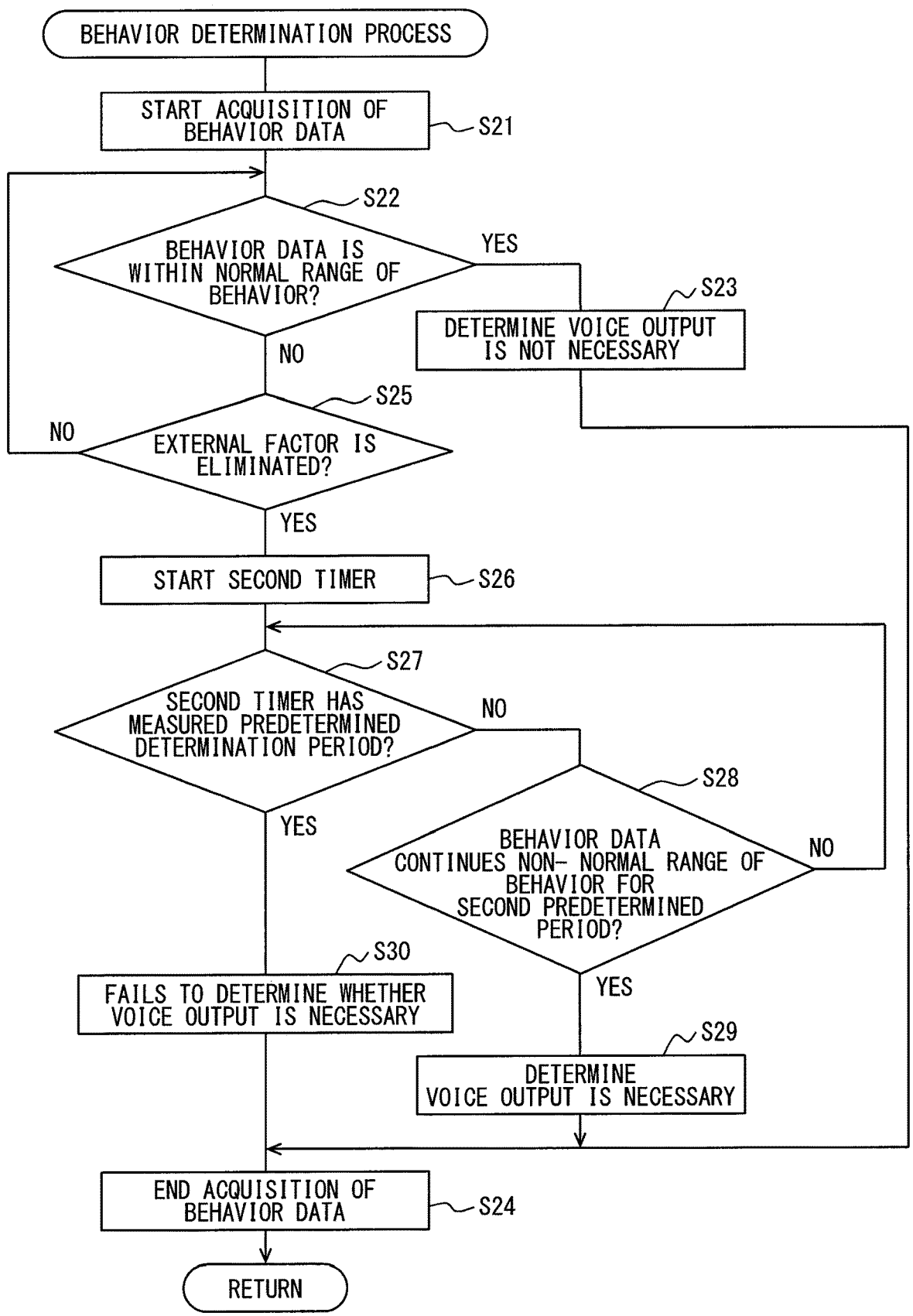
FIG. 5 shows another subroutine of the flowchart.
Figure 6:
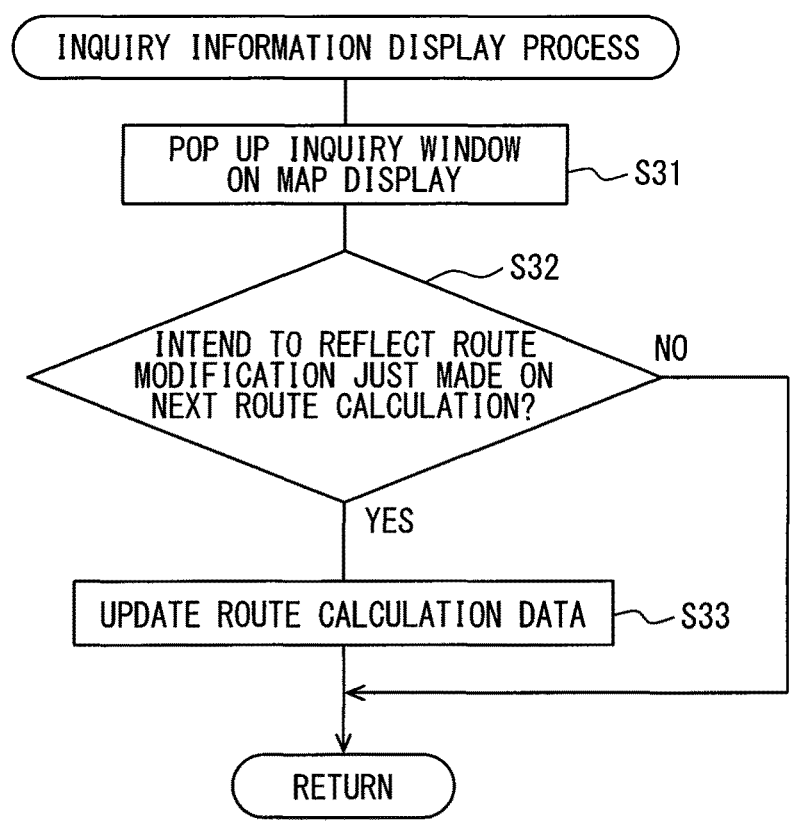
FIG. 6 shows still another subroutine of the flowchart.

Hereinafter, one embodiment of the present disclosure applied to a route calculation system installed to a vehicle will be described with reference to the drawings. A route calculation system 1 includes a controller 2, a navigation unit 3, a brain activity detection unit 4, a brain activity database 5, a behavior detection unit 6, and a behavior database 7.

The controller 2 is provided by a microcomputer having a CPU (Central Process Unit), a ROM (Read Only Memory), a RAM (Random Access Memory), and an I-O (Input-Output). The controller 2 performs a process according to a computer program stored in a non-transitory tangible recording medium by running the computer program and thereby controls an overall operation of the route calculation system 1.

The navigation unit 3 includes a present location identification portion 3a, a destination setting portion 3b, a route calculation portion 3c (corresponding to a route calculation unit), a route calculation database 3d (corresponding to a route calculation data storage unit), a route guide portion 3e, a voice output portion 3f (corresponding to a notification information output unit), a display portion 3g (corresponding to an inquiry information output unit), and an operation acceptance portion 3h (corresponding to a reply information acceptance unit). The voice output portion 3f is provided by a speaker disposed near a driver's seat. The display portion 3g is provided by a liquid crystal display disposed near the driver's seat. The operation acceptance portion 3h is provided by a touch panel of the liquid crystal display.

The present location identification portion 3a identifies a present location of the vehicle by using, for example, a GPS signal or the like transmitted from a GPS (Global Positioning System). The destination setting portion 3b sets a destination inputted by the user through a destination input operation. The route calculation portion 3c calculates a route from a present location of the vehicle to a destination by using route calculation data stored in the route calculation database 3d. The route calculation data is data necessary to calculate a route and includes data on road links and nodes.

The route guide portion 3e provides a guidance along the route calculated by the route calculation portion 3c. The voice output portion 3f outputs a voice notification message, for example, "turn right at intersection 300 meters ahead" and "be aware of traffic merging" in association with a route guidance provided by the route guide portion 3e. As is shown in FIG. 2, the display portion 3g displays present location information P indicating a present location of the vehicle identified by the present location identification portion 3a and route information R indicating a route calculated by the route calculating portion 3c both superimposed on a map screen in association with a route guidance provided by the route guide portion 3e.

When a present location of the vehicle deviates from the calculated route and a state of the present location of the vehicle deviating from the route continues for a predetermined period or over a predetermined distance (when a predetermined recalculation condition is satisfied), the route calculation portion 3c recalculates the route. When the route calculation portion 3c starts to recalculate the route, the voice output portion 3f outputs a voice notification message (notification information informing a recalculation of the route), for example, "you are deviating from the scheduled route, new route is being recalculated". When the route calculation portion 3c recalculates the route, the display portion 3g displays updated route information R. More specifically, given that, as is shown in FIG. 2, the vehicle is heading from an intersection in Town D to an intersection in Town C and guided along a route which recommends the user to take a right turn at an intersection in Town A. When the vehicle turns to the right at the intersection in Town C before the intersection in Town A, the display portion 3g changes an orientation of the map screen and displays updated route information R. In an example of FIG. 2, the display portion 3g updates scheduled route information R to a new route information R. The scheduled route information R represents a route before the vehicle turns to the right at the intersection in Town C, that is, a route to an intersection in Town E by way of the intersection in Town C, an intersection in Town B, and the intersection in Town A. The new route information R represents a route after the vehicle turns to the right at the intersection in Town C, that is, a route to the intersection in Town E by way of an intersection in Town G and an intersection in Town F.

The brain activity detection unit 4 detects brain activity of the user (driver) by using a NIRS (Near Infra-Red Spectroscopy) technique. In the realm of brain information process, two systems, one is a communication system supported by neural activity and the other is an energy supply system supporting neural activity, are thought to be tightly linked to each other. At an onset of neural activity, peripheral blood vessels expand and an adjustment mechanism supplying a large volume of arterial blood containing oxygen and glucose as an energy source starts to function. It is hypothesized that an oxidation state of blood (a ratio of oxyhemoglobin concentration to deoxyhemoglobin concentration) changes due to an increase in volume of blood flow and volume of blood in tissue in close proximity to active nerve. Such a relationship between neural activity and a cerebral blood reaction is called neurovascular coupling. According to the NIRS technique, brain activity of the user is detected by detecting local hemoglobin concentration in the brain under hypothesis that neurovascular coupling is present.

More specifically, the brain activity detection unit 4 includes an irradiation portion 4a irradiating near-infrared light onto scalp of the user, and a light receiving portion 4b receiving diffused reflection light of near-infrared light irradiated from the irradiation portion. When near-infrared light is irradiated onto scalp of the user from the irradiation portion 4a, an optic element of irradiated near-infrared light diffuses into brain tissue owing to a high passing capability to pass through a living body, such as skin and bones, and reaches a cerebral cortex about 20 to 30 millimeters deep from the scalp. The light receiving portion 4b detects an optic element irregularly reflected at a point several centimeters away from an irradiation point due to light absorbing characteristics which differ dependent on oxyhemoglobin concentration and deoxyhemoglobin concentration in blood. By detecting an optical element in the manner as above, the brain activity detection unit 4 estimates variances in oxyhemoglobin concentration and deoxyhemoglobin concentration at the cerebral cortex and detects brain activity of the user. Alternatively, the brain activity detection unit 4 may detect brain activity of the user by estimating a variance in total hemoglobin concentration, which is a sum of oxyhemoglobin concentration and deoxyhemoglobin concentration at the cerebral cortex, in addition to variances in oxyhemoglobin concentration and deoxyhemoglobin concentration.

After the brain activity detection unit 4 detects brain activity of the user, a detection result is converted to digital brain activity data. The brain activity data is stored into the brain activity database 5 each time new one is detected. The old brain activity data stored in the brain activity database 5 is updated by the newly detected brain activity data, and is compared with the newly detected brain activity data. The brain activity detection unit 4 pre-sets a comfortable threshold and an uncomfortable threshold used as determination criteria based on the brain activity data stored in the brain activity database 5. When the brain activity data is at or above the comfortable threshold, the brain activity detection unit 4 determines that the user is comfortable. When the brain activity data is below the comfortable threshold and at or above the uncomfortable threshold, the brain activity detection unit 4 determines that the user is normal (neither comfortable nor uncomfortable). When the brain activity data is below the uncomfortable threshold, the brain activity detection unit 4 determines that the user is uncomfortable. The brain activity detection unit 4 outputs, to the controller 2, a detection result signal indicating a detection result of brain activity of the user detected in the manner as above. The brain activity detection unit 4 may constantly detect brain activity of the user or may start a detection under a condition that a detection start command signal is inputted from the controller 2 and end the detection under a condition that a detection end command signal is inputted from the controller 2.

The behavior detection unit 6 detects a behavior of the user by using an image analysis technique and a voice recognition technique. More specifically, the behavior detection unit 6 includes an imaging portion 6a capturing an image of an upper half of the user including a face, and a voice input portion 6b via which a voice uttered by the user is inputted. The behavior detection unit 6 captures an image of the user regarding an eye movement (visual line), a mouth movement (speech), and a facial expression by using the imaging portion 6a and inputs a voice uttered by the user by using the voice input portion 6b. The behavior detection unit 6 detects a behavior of the user by identifying a change in eye movement, mouth movement, and facial expression of the user, and voice uttered by the user. The behavior detection unit 6 may detect a behavior of the user by using at least one of an eye movement, a mouth movement, a facial expression, and a voice uttered by the user or by combining two or more of the foregoing.

When the behavior detection unit 6 detects a behavior of the user, a detection result is converted to digital behavior data. The behavior data is stored into the behavior database 7 each time new one is detected to update old behavior data stored in the behavior database 7 and to check the newly detected behavior data against old behavior data. The behavior detection unit 6 pre-sets a comfortable threshold and an uncomfortable threshold used as criteria for determination from the behavior data stored in the behavior database 7. When the behavior data is at or above the comfortable threshold, the behavior detection unit 6 detects that the user is comfortable and detects that the user is normal (neither conformable nor uncomfortable) when the behavior data is below the comfortable threshold and at or above the uncomfortable threshold. The behavior detection unit 6 detects that the user is uncomfortable when the behavior data is below the uncomfortable threshold. The behavior detection unit 6 outputs a detection result signal indicating a detection result of the behavior of the user detected in the manner as above to the controller 2. The behavior detection unit 6 may constantly detect a behavior of the user or may start a detection under a condition that a detection start command signal is inputted from the controller 2 and end the detection under a condition that a detection end command signal is inputted from the controller 2.

The controller 2 includes a brain activity determination portion 2a (corresponding to a brain activity determination unit), a behavior determination portion 2b (corresponding to a behavior determination unit), a notification determination portion 2c (corresponding to a notification determination unit), a notification control portion 2d (corresponding to a notification control unit), and an update control portion 2e (corresponding to an update control unit). The respective portions 2a through 2e are provided by the controller 2 which executes respective computer programs, and are achieved in software manner.

The brain activity determination portion 2a determines a detection result of the brain activity detection unit 4 according to a detection result signal inputted into the controller 2 from the brain activity detection unit 4. The behavior determination portion 2b determines a detection result of the behavior detection unit 6 according to a detection result signal inputted into the controller 2 from the behavior detection unit 6. The notification determination portion 2c determines whether an output of a voice notification message described above is necessary by using a determination result of the brain activity determination portion 2c and a determination result of the behavior determination portion 2b after the route is recalculated by the route calculation portion 3c. The notification control portion 2d determines whether to enable or disable an output of a voice notification message from the voice output portion 3f by using a determination result of the notification determination portion 2c. The update control portion 2e updates route calculation data stored in the route calculation database 3d.

A function of the configuration as above will now be described with reference to FIG. 3 through FIG. 13.

In the route calculation system 1, the controller 2 performs voice notification message output determination process. When the voice notification message output determination process starts, the controller 2 determines whether a present location of the vehicle is deviating from the route calculated by the navigation unit 3 (S1). When it is determined that the present location of the vehicle is deviating from the calculated route (S1: YES), the controller 2 proceeds to brain activity determination process (S2, corresponding to a brain activity determination step).

When the brain activity determination process starts, the controller 2 starts acquisition of brain activity data from a detection result signal inputted from the brain activity detection unit 4 (S11). The controller 2 regularly acquires brain activity data at predetermined time intervals (for example, every several milliseconds) and determines whether the brain activity data is within a normal range of activity by determining brain activity of the user at a present moment, that is, brain activity of the user immediately after the present location of the vehicle deviates from the calculated route (S12). In a case where the user deviates from the route accidentally by mistake, the user is probably a stranger in a present area and has no idea about the present location of the vehicle. It is therefore highly likely that brain activity of the user goes out of the normal range of activity due to stress arising from taking a wrong route. Meanwhile, in a case where the user deviates from the route purposefully, the user is probably familiar with the area and knows the present location of the vehicle. It is therefore highly likely that brain activity of the user does not go out of the normal range of activity and remains normal.

Figure 7A:
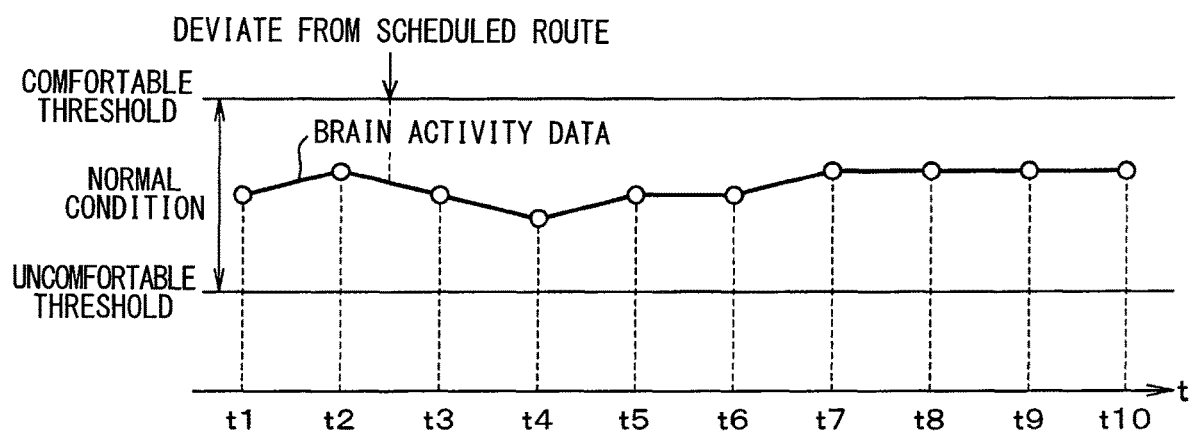
FIG. 7A shows a variance in brain activity data (first example)

When it is determined that the brain activity data is within the normal range of activity (S12: YES), the controller 2 determines that the user deviates from the route purposefully and an output of a voice notification message is not necessary (S13). The controller 2 therefore ends acquisition of the brain activity data (S14) and ends the brain activity determination process. That is, when the user deviates from the route purposefully, the brain activity data does not go out of the normal range of activity and remains within the normal range of activity as is shown in FIG. 7A. Hence, the controller 2 determines that an output of a voice notification message is not necessary.

Meanwhile, when it is determined that the brain activity data is not within the normal range of activity (out of the normal range of activity) (S12: NO), the controller 2 further determines whether an external factor is eliminated (S15). An external factor may include a change in environment surrounding the user, for example, an abrupt change in acceleration or vibration applied to the vehicle while the vehicle is moving. The time point when the present location of the vehicle deviates from the calculated route may accidentally overlap with the time point when the environment surrounding the user changes. In this case, the deviation of the present location of the vehicle from the calculated route does not cause a substantial change of the brain activity data, and the brain activity data may remain within the normal range of activity. However, the change in environment surrounding the user may cause a change of the brain activity data, and the brain activity data may temporarily go out of the normal range of activity. The controller 2 takes the foregoing into consideration and returns to Step S12 when it is determined that an external factor is not eliminated (S15: NO) and repeats Step S12 and the following steps.

Figure 7B:
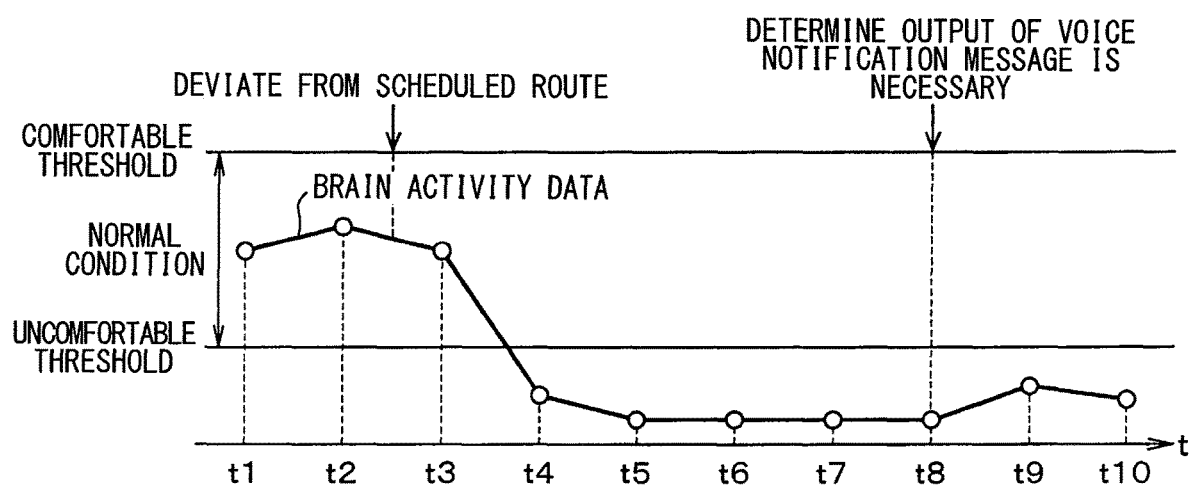
FIG. 7B shows a variance in brain activity data (second example)

When it is determined that an external factor is eliminated (S15: YES), the controller 2 starts a first timer measuring a first determination period (for example, several seconds) (S16). The controller 2 monitors whether the first timer has measured the first determination period (S17) and monitors whether a state of the brain activity data being out of the normal range of activity continues for a first predetermined period (S18). When it is determined that a state of the brain activity data being out of the normal range of activity (first predetermined state) continues for the first predetermined period (S18: YES), the controller 2 determines that the user deviates from the route accidentally by mistake and an output of a voice notification message is necessary (S19). Subsequently, the controller 2 ends acquisition of the brain activity data (S14) and ends the brain activity determination process. That is, in a case where the user deviates from the route accidentally by mistake, the brain activity data goes out of the normal range of activity and such a state continues for the first predetermined period (for example, a period from a time point t4 to a time point t8) as is shown in FIG. 7B. Hence, the controller 2 determines that an output of a voice notification message is necessary to eliminate anxiety of the user.

Figure 7C:
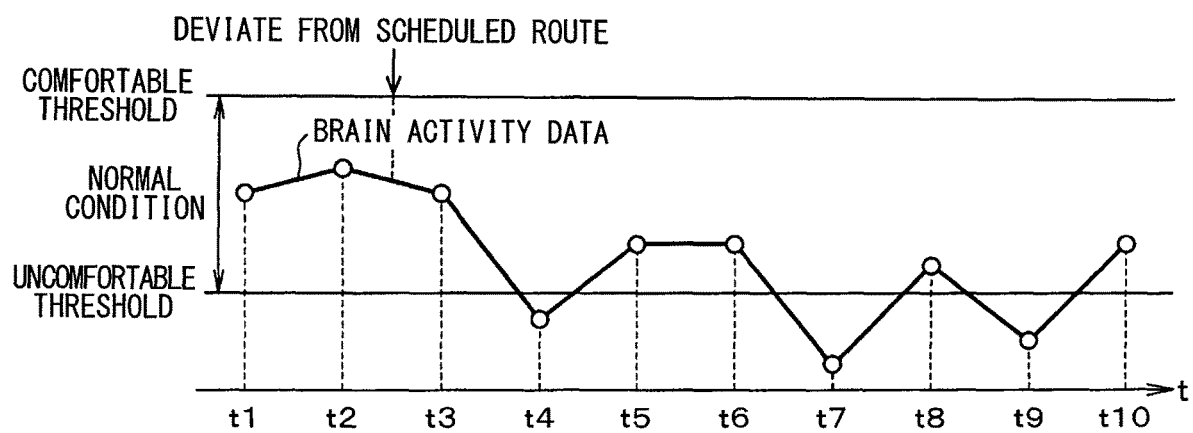
FIG. 7C shows a variance in brain activity data (third example)

When it is determined that the first timer has measured the first determination period (S17: YES), the controller 2 determines that a necessity of an output of a voice notification message cannot be determined (S20). The controller 2 therefore ends acquisition of the brain activity data (S14) and ends the brain activity determination process. That is, in a case where the brain activity data is unstable near a boundary of the normal range of activity as is shown in FIG. 7C, the controller 2 determines that a necessity of an output of a voice notification message cannot be determined.

When the brain activity determination process ends, the controller 2 proceeds to behavior determination process (S3, corresponding to a behavior determination step). When the behavior determination process starts, the controller 2 starts acquisition of the behavior data from a detection result signal inputted from the behavior detection unit 6 (S21). The controller 2 periodically acquires the behavior data at regular time intervals (for example, every several milliseconds) and determines a behavior of the user at a present moment, that is, immediately after a present location of the vehicle deviates from the calculated route (S22). As in the brain activity determination process, in a case where the user deviates from the route accidentally by mistake, the user is probably a stranger in a present area and has no idea about the present location of the vehicle. Hence, it is highly likely that a behavior of the user goes out of a normal range of behavior due to stress arising from taking a wrong route. Meanwhile, in a case where the user deviates from the route purposefully, the user is probably familiar with the area and knows the present location of the vehicle. Hence, it is highly likely that a behavior of the user does not go out of the normal range of behavior and remains normal.

Figure 8A:
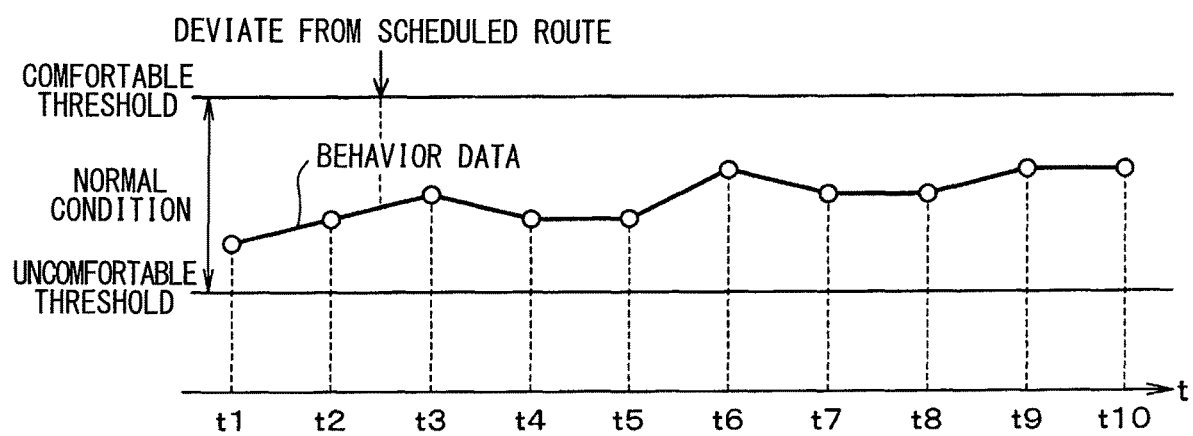
FIG. 8A shows a variance in behavior data (first example)

When it is determined that the behavior data is within the normal range of behavior (S22: YES), the controller 2 determines that the user deviates from the route purposefully and an output of a voice notification message is not necessary (S23). The controller 2 therefore ends acquisition of the behavior data (S24) and ends the behavior determination process. That is, in a case where the user deviates from the route purposefully, the behavior data does not go out of the normal range of behavior and remains within the normal range of behavior as is shown in FIG. 8A. Hence, the controller 2 determines that an output of a voice notification message is not necessary.

Meanwhile, when it is determined that the behavior data is not within the normal range of behavior (out of the normal range of behavior) (S22: NO), the controller 2 also further determines whether an external factor is eliminated (S25) as in the brain activity determination process. When it is determined that an external factor is not eliminated (S25: NO), the controller 2 returns to Step S22 and repeats Step S22 and the following steps.

When it is determined that an external factor is eliminated (S25: YES), the controller 2 starts a second timer measuring a second determination period (for example, several seconds) (S26). The controller 2 monitors whether the second timer has measured the second determination period (S27) and monitors whether a state of the behavior data being out of the normal range of behavior (second predetermined state) continues for a second predetermined period (S28). When it is determined that a state of the behavior data being out of the normal range of behavior continues for the second predetermined period (S28:YES), the controller 2 determines that the user deviates from the route accidentally by mistake and an output of a voice notification message is necessary (S29). The controller 2 therefore ends acquisition of the behavior data (S24) and ends the behavior determination process. That is, in a case where the user deviates from the route accidentally by mistake, behavior data goes out of the normal range of behavior and such a state continues for the second predetermined period (for example, a period from t4 to t8) as is shown in FIG. 8B. Hence, the controller 2 determines that an output of a voice notification message is necessary to eliminate anxiety of the user.

Figure 8C:
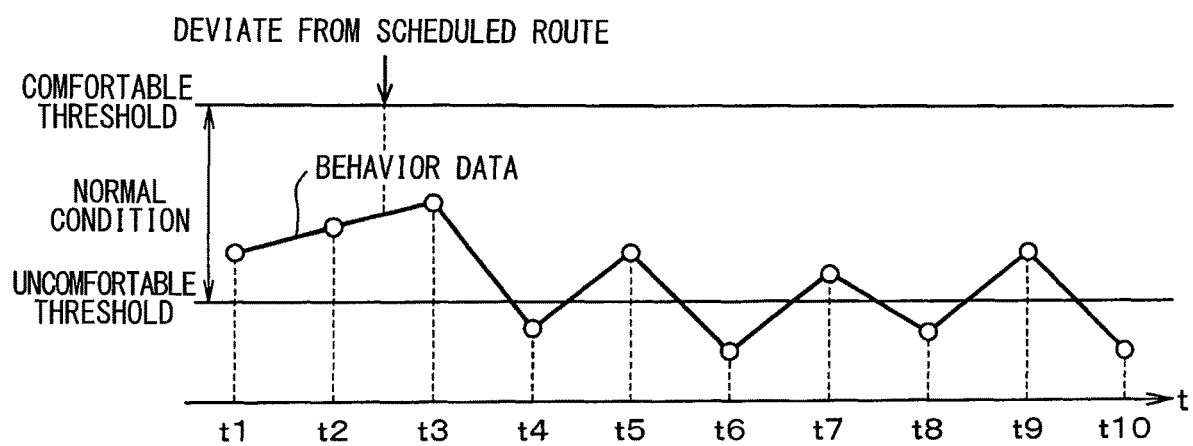
FIG. 8C shows a variance in behavior data (third example)

When it is determined that the second timer has measured the second determination period (S27: YES), the controller 2 determines that a necessity of an output of a voice notification message cannot be determined (S30). The controller 2 therefore ends acquisition of the behavior data (S24) and ends the behavior determination process. That is, in a case where the behavior data is unstable near a boundary of the normal range of behavior as is shown in FIG. 8C, the controller 2 determines that a necessity of an output of a voice notification message cannot be determined.

When the behavior determination process ends, the controller 2 determines a determination result of the brain activity determination process and a determination result of the behavior determination process in a comprehensive manner and finally determines whether an output of a voice notification message is necessary (S4 and S5, corresponding to a notification determination step). When it is finally determined that an output of a voice notification message is necessary (S4: YES), the controller 2 enables an output of a voice notification message (S6, corresponding to a notification control step) and ends the voice notification message output determination process. Meanwhile, when it is finally determined that an output of a voice notification message is not necessary (S5: YES), the controller 2 disables an output of a voice notification message (S7, corresponding to the notification control step) and ends the voice notification message output determination process. When it is determined that a necessity of an output of a voice notification message cannot be determined (S5: NO), the controller 2 proceeds to inquiry information display process (S8).

That is, as are set forth in FIG. 9 through FIG. 12, the controller 2 makes a comprehensive determination by combining a determination result of the brain activity determination process and a determination result of the behavior determination process, and determines whether to enable or disable an output of a voice notification message or whether to inquire about an intention to modify the route. In a case where a high priority is given to enabling a voice output, as is set forth in FIG. 9, when it is determined that a voice out is necessary as at least one of a determination result of the brain activity determination process or a determination result of the behavior determination process, the controller 2 finally determines that a voice output is necessary and determines to enable an output of a voice notification message. In a case where a priority is given to disabling a voice output, as are set forth in FIG. 10 and FIG. 11, when it is determined that a voice output is not necessary as at least one of a determination result of the brain activity determination process or a determination result of the behavior determination process, the controller 2 finally determines that a voice output is not necessary and determines to disable an output of a voice notification message. In a case where a high priority is given to an inquiry about an intention to modify the route, as is set forth in FIG. 12, when it is determined that a necessity of a voice output cannot be determined as at least one of a determination result of the brain activity determination process or a determination result of the behavior determination process, the controller 2 finally determines that a necessity of a voice output cannot be determined and determines to inquire about an intention to modify the route.

Figure 13:
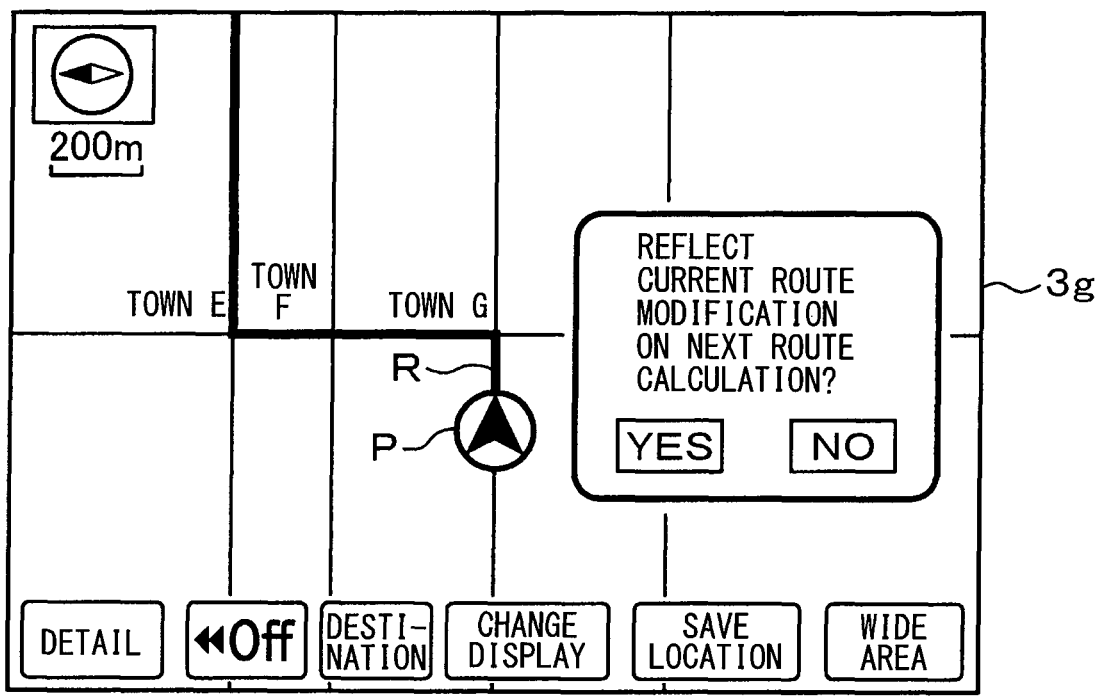
FIG. 13 is a view showing an inquiry screen.

When the inquiry information display process starts, the controller 2 pops up an inquiry window on the map display as is shown in FIG. 13 (S31) and waits for a reply from the user (S32). Herein, the controller 2 displays an inquiry message, for example, "Reflect current route modification on next route calculation?" on the inquiry screen. When it is determined the user has an intention to reflect a route modification just made on a next route calculation by depressing a "YES" key (S32: YES), the controller 2 updates the route calculation data stored in the route calculation database 3d by reflecting the route modification just made on the route calculation data (S33) and ends the inquiry information display process. Meanwhile, when it is determined that the user does not have an intention to reflect a route modification just made on a next route calculation by depressing a "NO" key (S32: NO), the controller 2 ends the inquiry information display process without updating the route calculation data.

According to the present embodiment described above, advantages as follows can be obtained.

In the route calculation system 1, brain activity of the user immediately after a present location of the vehicle deviates from the calculated route is determined, and it is determined that the user deviates from the route accidentally by mistake when the brain activity of the user is out of the normal range of activity. In this case, an output of a voice notification message informing a recalculation of the route is enabled. On the contrary, when the brain activity of the user remains normal, it is determined that the user deviates from the route purposefully. In this case, an output of a voice notification message is disabled. Accordingly, when the user deviates from the route accidentally by mistake, anxiety of the user can be eliminated by outputting a voice notification message. Meanwhile, when the user deviates from the route purposefully, the user is no longer annoyed by an output of a voice notification message because output of the voice notification message is forbidden. Hence, convenience can be enhanced because a voice notification message informing a recalculation of the route can be outputted only when necessary.

In the route calculation system 1, when it is determined that a state of brain activity of the user being out of the normal range of activity continues for the first predetermined period, it is determined that an output of a voice notification message is necessary. The configuration as above is capable of avoiding a risk of erroneously determining that brain activity of the user is within the normal range of activity due to noise or the like when actual brain activity of the user is out of the normal range of activity when determining a detection result of brain activity of the user.

In the route calculation system 1, a detection result of a behavior of the user is determined in addition to a detection result of brain activity of the user, and it is determined that the user deviates from the route accidentally by mistake when the brain activity or the behavior of the user is out of the normal range of activity or behavior. In this case, an output of a voice notification message informing a recalculation of the route is enabled. On the contrary, when the brain activity or the behavior of the user remains normal, it is determined that the user deviates from the route purposefully. In this case, an output of a voice notification message is disabled. By using both of a detection result of brain activity of the user and a detection result of a behavior of the user, whether the user deviates from the route accidentally by mistake or purposefully can be accurately determined from various aspects.

In the route calculation system 1, when it is determined that a state of a behavior of the user being out of the normal range of behavior continues for the second predetermined period, it is determined that an output of a voice notification message is necessary. The configuration as above is capable of avoiding a risk of erroneously determining that a behavior of the user is within the normal range of behavior due to noise or the like when an actual behavior of the user is out of the normal range of behavior also when determining a detection result of behavior of the user.

While the disclosure has been described with reference to the above-described embodiments thereof, it is to be understood that the disclosure is not limited to the above-described embodiments and constructions. The disclosure is intended to cover various modification and equivalent arrangements. In addition, the various combinations and configurations, which are preferred, other combinations and configurations, including more, less or only a single element, are also within the spirit and scope of the disclosure.

The present embodiment has described a configuration in which the present disclosure is applied to a route calculation system installed to a vehicle as an example. Alternatively, the present disclosure is also applicable to a system installed to another object other than a vehicle. For example, the present disclosure may be applied to a route calculation system installed to a portable information terminal carried by the user.

In the present embodiment, both of a determination result of the brain activity determination process and a determination result of the behavior determination process are used. Alternatively, whether to enable or disable an output of a voice notification message may be determined by using only a determination result of the brain activity determination process. That is, a determination result of the behavior determination process is not necessarily used and may be used as needed. In a case where both of a determination result of the brain activity determination process and a determination result of the behavior determination process are used, the brain activity determination process and the behavior determination process may be performed in parallel.

The present embodiment uses the NIRS technique as a technique to detect brain activity of the user. Alternatively, any other appropriate technique may be used instead.

What is claimed is:

1. A route calculation system, comprising:
   a route calculation data storage unit configured to store route calculation data;
   a route calculation unit configured to calculate a route using the route calculation data and recalculate the route using the route calculation data when a predetermined recalculation condition is satisfied;
   a notification information output unit configured to output notification information informing a recalculation of the route;
   a brain activity detection unit configured to detect brain activity of a user;
   a brain activity determination unit configured to determine a detection result of the brain activity detection unit;
   a notification determination unit configured to determine whether an output of the notification information is necessary according to a determination result of the brain activity determination unit obtained after the route is recalculated by the route calculation unit; and
   a notification control unit configured to enable the output of the notification information when the notification determination unit determines that the output of the notification information is necessary and disable the output of the notification information when the notification determination unit determines that the output of the notification information is not necessary,
   wherein,
   when the brain activity determination unit determines that the brain activity of the user continues a first predetermined state for a first predetermined period as the determination result, the notification determination unit determines that the output of the notification information is necessary.

2. The route calculation system according to claim 1, further comprising:
   a behavior detection unit configured to detect a behavior of the user; and
   a behavior determination unit configured to determine a detection result of the behavior detection unit,
   wherein the notification determination unit determines whether the output of the notification information is necessary according to the determination result of the brain activity determination unit obtained after the route is recalculated by the route calculation unit and a determination result of the behavior determination unit obtained after the route is recalculated by the route calculation unit.

3. The route calculation system according to claim 2, wherein:
   when the behavior determination unit determines that the behavior of the user continues a second predetermined state for a second predetermined period as the determination result, the notification determination unit determines that the output of the notification information is necessary.

4. The route calculation system according to claim 1, further comprising:
   an inquiry information output unit configured to output inquiry information that inquires the user about an intention to modify the route,
   wherein the notification control unit controls the inquiry information output unit to output the inquiry information when the notification determination unit fails to determine whether to output the notification information or not.

5. The route calculation system according to claim 4, further comprising:

a reply information acceptance unit configured to accept reply information to the inquiry information from the user; and an update control unit configured to update the route calculation data by reflecting a route modification on the route calculation data when the intention to modify the route is accepted at the reply information acceptance unit as the reply information.

6. The route calculation system according to claim 1, wherein:

the route calculation system is installed to a vehicle.

7. A computer program product stored in a non-transitory storage medium and comprising instructions to be executed by a controller of a route calculation system, wherein the route calculation system includes:

a route calculation data storage unit configured to store route calculation data;

a route calculation unit configured to calculate a route using the route calculation data and recalculate the route using the route calculation data when a predetermined recalculation condition is satisfied; and a notification information output unit configured to output notification information informing a recalculation of the route, the instructions for implementing:

a brain activity determination step of determining a detection result of a brain activity detection unit which detects a brain activity of a user;

a notification determination step of determining whether an output of the notification information is necessary according to a determination result of the brain activity determination step performed after the route is recalculated by the route calculation unit; and a notification control step of enabling the output of the notification information when the output of the notification information is determined to be necessary in the notification determination step and disabling the output of the notification information when the output of the notification information is determined to be not necessary in the notification determination step, wherein, when the determination result of the brain activity determination step indicates that the brain activity of the user continues a first predetermined state for a first predetermined period, the output of the notification information is determined to be necessary in the notification determination step.

8. The computer program product according to claim 7, further comprising instructions to be executed by the controller for implementing:

a behavior determination step of determining a detection result of a behavior detection unit which detects a behavior of the user, wherein, in the notification determination step, the output of the notification information is determined to be necessary or not according to the determination result of the brain activity determination step performed after the route is recalculated by the route calculation unit and a determination result of the behavior determination step performed after the route is recalculated by the route calculation unit.

9. A computer-readable non-transitory storage medium storing the computer program product according to claim 7.

* * * * *